Sept. 7, 1937.  R. N. GEFFROY  2,092,275
GROUSER ARRANGEMENT FOR TRACTOR WHEELS
Filed Aug. 6, 1935
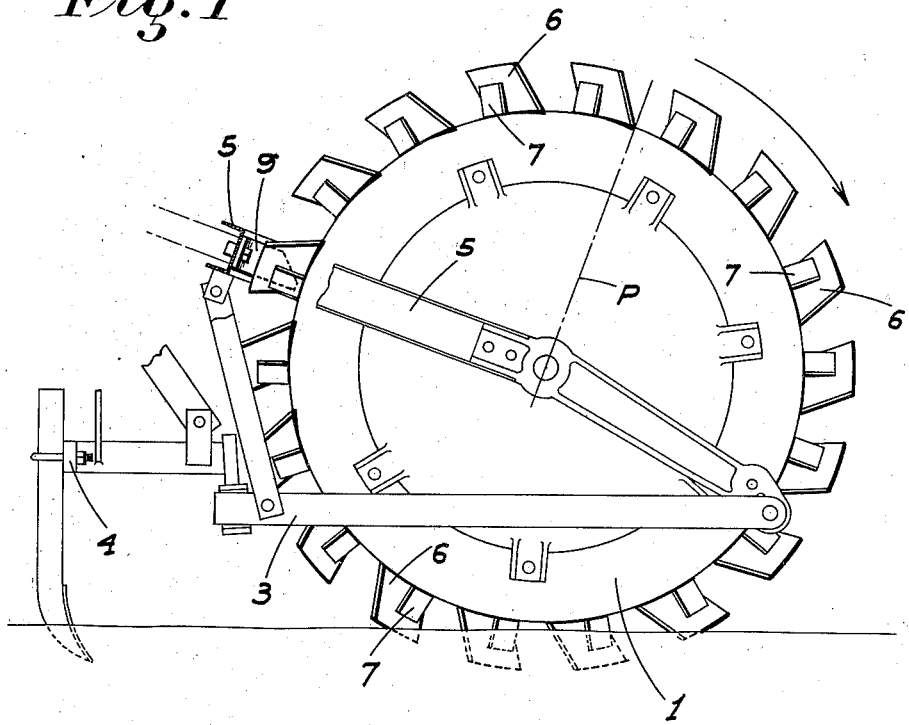
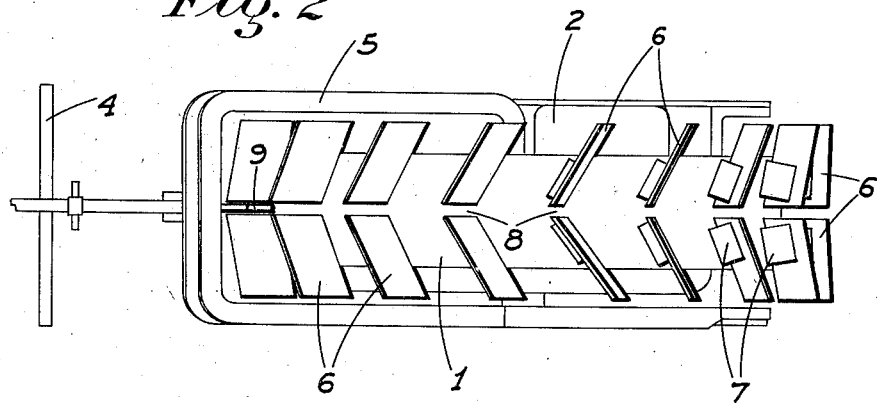
INVENTOR
R. N. Geffroy
BY
ATTORNEY Patented Sept. 7, 1937

2,092,275

UNITED STATES PATENT OFFICE 2,092,275

GROUSER ARRANGEMENT FOR TRACTOR WHEELS

Ralph N. Geffroy, Stockton, Calif.

Application August 6, 1935, Serial No. 34,901

1 Claim. (Cl. 301—43)

This invention relates to tractors of the single driven wheel type, and particularly to a grouser arrangement for the drive wheel of such tractors.

This drive wheel leads the trailer and implements connected to the tractor and must pull them, and it is of course desirable that it shall run ahead in a straight line irrespective of the surface contour of the soil or its nature and condition. To provide a grouser arrangement which will give the above desired result, as well as provide the necessary traction in all soils, would not be difficult if this leading wheel were an idler as is ordinarily the case. Being a driver however and being out in front and unsupported at the sides, it must have a special grouser arrangement which will in itself give the desired forward straight-line lead.

I have found from considerable experimentation that grousers of the conventional spike, spade, or cleat type do not prevent the single drive wheel from side slipping or side milling—the latter being a term used when the pull is heavy in loose dry top soil and dry sandy soils and the wheel then tends to slip and mill off sideways in one direction or the other. Also with these ordinary grousers I have found it practically impossible for the single wheel to mount and stay on a loose dry ridge or be steered out of a loose dry furrow when the wheel is pulling its normal load. I have also found from considerable experimentation that loose, dry, finely pulverized soil and sandy soils when dry are the most difficult in which to secure traction and support.

The principal objects of my invention therefore are to provide a grouser arrangement which enables the drive wheel to mount a loose dry ridge and run straight along the same without slipping off sideways; which enables the tractor to be steered out of a loose dry furrow without the slightest angle with the furrow without slipping back; which does not tend to hunt low places; which avoids digging up the dirt when leaving the same, or fouling with dirt or weeds; and one which will be of light weight construction.

Essentially my special grouser arrangement consists of grouser units spaced around the tire of the wheel, each unit comprising a pair of plates set in herringbone fashion across the wheel and with their leading faces at an obtuse angle to each other, and also set at a backward angle relative to a plane radially of the wheel. It is this particular arrangement which causes the driving and pulling wheel of the tractor, when moving down and back against the inverted back angled V-shaped grouser units, to automatically cause said wheel to center itself in a vertical longitudinal plane. Also the grouser units are arranged so that one will not start to leave the ground until the next one is completely engaged with the ground. The back angled arrangement causes the grouser plates to engage the ground flatly and tend to pack said ground when entering the same, and to lift straight up out of the ground when leaving the same, so as not to loosen and churn or cut up the ground, which would cause slippage.

These objects I accomplish by means of such structure and relative arrangement of parts as will fully appear by a perusal of the following specification and claim.

In the drawing similar characters of reference indicate corresponding parts in the several views:

Figure 1 is a side outline of a single wheel tractor showing my improved grouser arrangement thereon.

Figure 2 is a top plan view of the same.

Referring now more particularly to the characters of reference on the drawing, the tractor to which my grouser arrangement is applied preferably comprises a wheel 1 having an engine 2 mounted in unitary connection therewith and driving said wheel, as shown in my Patent No. 1,987,676, dated January 15, 1935. This wheel is mounted in connection with a frame structure 3 to which the implement supporting bar 4 is attached in swivel trailing relation, as in my copending application for patent, Serial No. 3,632, filed January 26, 1935. The frame structure includes a bar 5 extending along the sides of the wheel and then about the rear face of the same above the center thereof and suitably spaced both from the sides and periphery of the wheel.

The grouser arrangement applied to the wheel 1 comprises a plurality of grouser units spaced about the wheel. Each unit comprises a pair of plates 6 secured on and projecting outwardly from the periphery of the wheel, and extending laterally some distance beyond the side edges of the wheel so that adequate traction will be obtained even though the face of the wheel is relatively narrow. The frame 3 including the bar 5 is spaced sufficiently from the sides of the wheel to clear the ends of the grouser plates.

The plates are disposed in symmetrical relation to each other and to the wheel and preferably in herringbone fashion, and their leading faces are disposed at an obtuse angle to each other, such angle being preferably but not necessarily about 120°. The purpose and effect of thus positioning the plates on the wheel has been already set forth in the preamble. The plates are also disposed so that their leading faces have a backward slant as shown or so that they include an acute angle with the radial plane P of the wheel projected through the plates to the base, as indicated in Figure 1. This angle is preferably about 30° or so that when moving out of the ground, the plates will lift practically straight up and will not tend to dig up or throw the dirt.

The plates are reinforced by brace plates 7 preferably welded to their rear faces and disposed substantially radially of the wheel, both the plates and the braces being preferably welded to the wheel, to secure light weight construction, since no base flange for bolting or riveting to the wheel is thereby required.

I preferably space the plates 6 apart at their adjacent ends as at 8. If this space is made somewhat relatively wider than as suggested in the drawing the space alone would render the grouser units self cleaning since in most conditions of soil, when dry, the loose soil would tend to work out through the space and fall out with the forward rotation of the wheel. However since in moist soils the dirt would tend to accumulate and pack between the grousers irrespective of this space, I therefore provide in connection with the space as shown a positive means to automatically prevent such accumulation and packing of the earth whether the same is moist or dry. This cleaning means comprises a fixed finger 9 set on edge vertically and projecting to adjacent the periphery of the wheel from and secured to the back cross member of the frame bar 5. This finger is somewhat narrower than the spaces 8 and is positioned so that with the rotation of the wheel it will relatively move through said spaces and, of course, will pass through and break up and loosen any dirt clogged between and bridging the space between an adjacent pair of grouser plates, and between the grouser units.

Once loosened it falls off with the forward rotation of the top of the wheel. If left there however it will accumulate and pack so solidly as to require strenuous physical effort to remove it, and will also of course diminish effective tractive surface.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

In a single wheel garden tractor having an engine operatively connected to the wheel to rotate the same in one direction, a plurality of grousers arranged about the wheel in pairs, the grousers of each pair being disposed on opposite sides of and symmetrical with the median line of the wheel surface and having their leading faces disposed at an obtuse angle of less than 180° relative to each other, and at a rearward acute angle to radial lines projected through the base of the grousers; all relative to the direction of rotation of the wheel.

RALPH N. GEFFROY.